May 16, 1967     A. PEREZ     3,319,557

SELF-ADJUSTING AIR DEFLECTOR

Filed Feb. 10, 1965

INVENTOR
ARTHUR PEREZ
BY William J. Perry
ATTORNEY

United States Patent Office 3,319,557
Patented May 16, 1967

3,319,557
SELF-ADJUSTING AIR DEFLECTOR
Arthur Perez, Niles, Mich., assignor to Clark Equipment Company, a corporation of Michigan
Filed Feb. 10, 1965, Ser. No. 431,506
5 Claims. (Cl. 98—36)

The present invention relates to an air deflector, and more particularly to an air deflector for use in refrigerated display cases and the like which is self-adjusting to accommodate various vertical positions of a shelf or screen below which it is disposed.

In the display for sale at retail of items requiring refrigeration, as in self-service food stores such as supermarkets, it is desirable in many cases to circulate air over or through the refrigerated product. This is particularly true in the case of agricultural produce such as fruits and vegetables, although it is not limited thereto. Even before the development of refrigerated cases for display of such items in food stores, it was found that produce was kept in fresher condition and better preserved against spoilage by subjecting it to a current of air which, particularly in combination with a fine spray or mist of water applied to the produce, tended to keep fruits and vegetables cool and fresh, lessened drying and wilting, and reduced spoilage. The same holds true with today's referigerated cases, in which it may be said that in one sense refrigeration has replaced the fine mist of moisture. The desirability of subjecting the produce to a current of air, which normally is the cooled air circulated for applying the refrigerating temperature to the fruits and vegetables or other products, is commonly recognized and accordingly provision is made for ventilating such products. To assist in assuring penetration of the air current throughout the entire volume of produce, the produce is usually supported on a grid-like screen or shelf of wire or other material formed to provide a foraminate or perforate construction permitting air to pass through the shelf, at a desired elevation above the bottom of a tray provided as a part of the refrigerated case to serve as a chamber in which the produce is disposed on the shelf. The shelf is arranged for vertical adjustment in the tray or chamber, so as to be disposable at various heights best suited to accommodate the kind, size and quanity of the particular produce carried thereon. The current of air normally is introduced through a suitable passage or passages opening along one edge of the case, and is blown toward the opposite edge, losing some of its velocity or strength as it progresses across the case. The result is that while the produce adjacent the edge at which the air is introduced is satisfactorily cooled and ventilated, the products closer to the opposite edge are not equally penetrated by the air, and hence their condition tends to deteriorate in comparison to that of the products located closer to the air entry. The problem is increased by the fact that the air is usually introduced from the rear of the case, and the supporting shelf is disposed at an angle sloping downwardly from the rear in order to improve the visibility of the produce. The produce accordingly tends to accumulate to a greater depth at the forward or lower edge of the shelf as a result of the process of selection by customers. Air introduced into the case may pass downwardly through the rear portion of the produce and under the shelf, and may be utilized to ventilate and cool the forward portion of the produce from below. To pass the portion of the air current flowing beneath the shelf upwardly through the produce, it is advisable to use a baffle or deflector, since otherwise the air is apt merely to flow to the front of the tray, with little if any passing upwardly through the shelf and the produce thereon.

Since the produce-supporting shelf is adjustable to various levels above the bottom of the tray or chamber, the deflector must as a practical matter adjust or accommodate to all of the various levels which the shelf assumes, and retain its effectiveness in directing the air upwardly through the shelf and articles thereon in any adjusted position. The baffle or deflector furthermore must be readily cleaned, and easily installed and removed to facilitate cleaning of the pan and thus save time and labor. The deflector of the present invention is arranged to be resiliently pivoted on the bottom of the tray or chamber so as to be biased upwardly to engage the shelf in at least the lowest of the shelf positions, and to extend at an angle upwardly and forwardly relative to the direction of the air stream in any of the adjusted shelf positions. The resilient means which effect biasing of the deflector serve also to mount it on the bottom of the pan or tray, providing a very simple means for this purpose, requiring only engagement of the resilient means through aperture means in the bottom of the tray, or disengagement from the aperture means to effect removal. Either mounting or removal of the baffle or deflector is readily accomplished with a single movement. The deflector is provided with stop means to limit the movement thereof under the urging of the resilient means, so as to provide an upwardly and forwardly inclined guide path for the air current even in its extreme or limiting position. Accordingly, the baffle or deflector need not be of a height to extend completely from the bottom of the tray to the shelf in even the highest adjusted position of the shelf. Since the deflector need not engage the shelf in all positions of the latter in order to be properly positioned for deflecting the air in the desired manner, it may be made of less material than would otherwise be required.

It is an object of the invention to provide an air deflector for directing air flowing beneath a reticulated or perforate article-supporting shelf in a display case to pass upwardly through the shelf and through and about the articles supported thereon.

It is another object to provide a deflector for directing upwardly through an open-type shelf vertically adjustable to different levels a current of air flowing beneath the shelf, which automatically adjusts to the different shelf positions.

Another object is the provision of an air deflector for directing air upwardly through a vertically adjustable perforate support, which in each adjusted position of the support will automatically assume a position for properly directing the air current whether engaged with the support or not.

Another object is the provision of an air deflector biased for automatic adjustment to various adjusted positions of a shelf or like support for directing an air current upwardly therethrough, which is simple in design and construction and readily cleanable.

Another object is the provision of an air deflector automatically accommodating to vertically adjusted positions of an open-type shelf for directing air upwardly therethrough, which is easily mounted or removed by a single movement to facilitate cleaning below the shelf and save time and labor.

Other and further objects, advantages and features of the invention will be apparent to those skilled in the art from the following detailed description, taken in conjunction with the accompanying drawings, in which.

Figure 1:
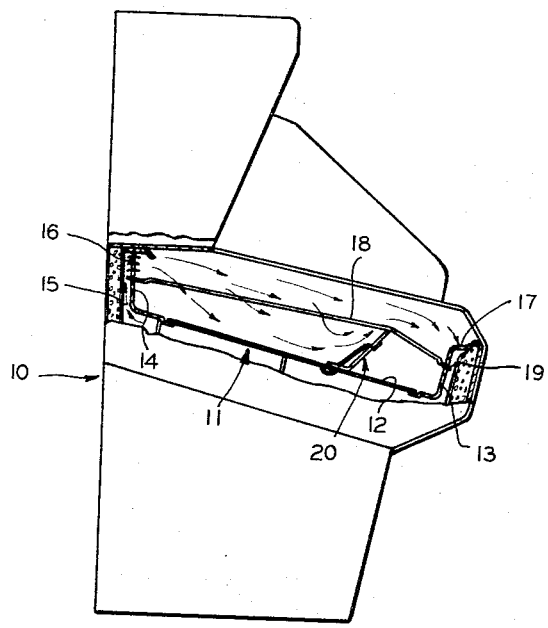
FIGURE 1 is a diagrammatic end elevation of a refrigerated display case for fruits, vegetables and the like, with a portion broken away to show the application thereto of the air deflector of this invention.

Referring first to FIG. 1 of the drawings, there is shown a refrigerated case generally indicated as 10 which includes an open-topped chamber in which the products are disposed for display and sale. The chamber is provided by a tray 11, which may be of any suitable depth, and is shown as disposed in a conventional position inclined downwardly and forwardly. The tray comprises a bottom 12, front wall 13, and rear wall 14, and is also provided with end walls (not shown). Below the tray, the case is provided with any desired refrigerating means, not shown, including a blower or other suitable air-moving means, by which a current of air is forced through a vertical passage 15 and a louvered opening 16 at the rear of the case to pass forwardly over and through the tray to a return opening 17 at the forward edge of the case 10. A shelf 18 is adjustably supported in the tray 11, so that it may be disposed at any of a plurality of levels or heights above the bottom 12 of the tray. In the present instance, shelf 18 is shown as provided with projections 19 at its forward and rearward edges to extend selectively through series of vertically spaced apertures in the front and rear tray walls 13 and 14 to effect the adjustment. The shelf is of an open type to permit passage of air therethrough, in the present case being formed of wire or rod in an articulated pattern, although it may be of perforated sheet metal or other foraminate material.

Figure 2:
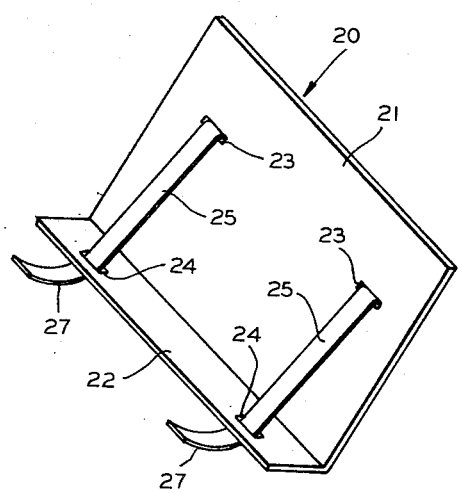
FIGURE 2 is an enlarged perspective view of the air deflector of FIG. 1.

Pivotally supported on the bottom 12 of the tray is an air deflector generally designated 20. As best shown in FIG. 2, the deflector 20 comprises a baffle portion 21 of panel or sheet material, such as sheet metal, which along one edge has a flange 22 projecting therefrom at a predetermined angle, which in this case is shown as substantially 120°. The length of the baffle 21, or its dimension transverse of the direction of the air stream, corresponds to that of the tray, but may be less if desired. Substantially aligned transversely of the edge along which the flange 22 extends are a plurality of pairs of apertures or slots 23 and 24. The apertures 23 are formed in the panel or baffle portion of the deflector, in alignment substantially parallel to the flanged edge, while the slots or apertures 24 are formed in the flange 22, in alignment with each other longitudinally thereof, and spaced from the baffle portion. Through each pair of apertures 23, 24 extends a flat spring 25, which may be formed of a strip of any suitable material, such as spring steel. These springs 25 extend across the angle included between the baffle 21 and flange 22, with one end of each spring being offset to extend through the aperture 23 and engage against the opposite face of the baffle 21, as shown at 26. The other end of each spring 25, extending beyond the flange 22, is curved as indicated at 27 or otherwise appropriately bent for a purpose explained herebelow.

Figure 3:
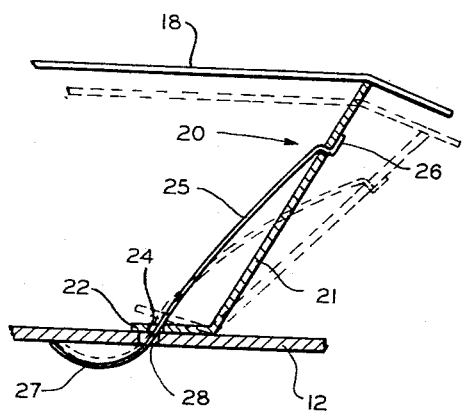
FIGURE 3 is a diagrammatic enlarged fragmentary end elevational view showing the mounting of the deflector in a display case, and illustrating two positions of the deflector corresponding to different positions of the shelf.

As best shown in FIG. 3, the deflector 20 is assembled with or mounted on the tray 11 by movement of the curved spring ends 27 through apertures 28 formed in the bottom 12 of the tray aligned with each other in a direction transverse of the direction of air flow, and spaced apart in correspondence to the spacing of the pairs of apertures 23, 24 from each other, or in other words in correspondence to the spacing of the springs 25. Thus, the deflector is easily mounted or removed simply by engaging the curved spring ends in the apertures and moving the deflector so that the flanged edge of the baffle 21 engages on the tray bottom 12, or by reversing this action to withdraw the spring ends from the apertures 28. The assembly or disassembly of the deflector 20 with the tray is therefore simple, and either is readily accomplished in a single motion. The end of the curved end portion 27 of each spring engages against the lower surface of the tray bottom, and by reason of this engagement and the engagement of the spring against the deflector flange 22 at the aperture 24, the resilience of the spring serves to bias the deflector to swing in a direction toward the end of the curved portion 27, or counterclockwise as viewed in FIG. 3.

The deflector 20 thus pivots upwardly or toward an upright position about its flanged edge under the force of the springs 25, which serve to mount it hingedly or pivotally on the tray bottom as well as to bias it. If not restrained, the deflector is stopped in its biased movement by engagement of the flange 22 against the bottom of the tray, the baffle portion 21 extending at an angle to the bottom 12 determined by the angle between it and its flange 22. This is a limiting or fully biased position which the deflector assumes if the shelf 18 is disposed at a distance above the bottom of the tray greater than the dimension of the baffle 21 transverse of its flanged or pivoting edge. In FIG. 3, the shelf 18 is shown at a level such as just to be engaged by the upper edge of the deflector 20 when the latter is in its fully biased position as stopped or limited by the engagement of flange 22 on the tray bottom 12. If the shelf 18 is disposed in a position lower than that shown in full lines, the deflector is disposed in a position rotated clockwise of the full line position, with the flange 22 raised from the bottom 12, by engagement with the shelf 18 in the lower position, as shown in dotted lines in the figure. The springs 25 maintain the deflector in this position engaging the shelf 18, or in a corresponding shelf-engaging position corresponding to any other vertically adjusted position of the shelf 18 sufficiently low to prevent movement of the deflector to the limiting or fully biased position shown in full lines in FIG. 3. It may be pointed out in this connection that the action of the springs 25 in urging the deflector to the full line position is augmented by the disposition of the springs so as to engage against the flange 22 at points spaced from the flanged or pivoting edge of the deflector, the flange portion between the apertures 24 and the baffle serving as a lever to increase the effect of the springs.

It will be evident that regardless of the vertically adjusted position of the shelf or screen 18, the deflector is disposed in a position inclined upwardly and forwardly relative to the direction of the current of air flowing under the shelf, so as to deflect the air upwardly through the shelf and through, about, or past the products or articles disposed on the shelf. The angle of the flange 22 to the panel or baffle portion 21 of the deflector is such as to provide this upward and forward inclination of the baffle regardless of the vertical position of the shelf. The flange angle may be varied as necessary to assure this upward and forward inclination of the deflector even in its most upright position, depending upon the angularity to the horizontal of the portion of the tray bottom 12 against which the flange 22 engages in the fully biased position of the deflector. As has already been stated hereinabove, in the present instance the flange extends at an angle of substantially 120° to the baffle portion 21, and it may be stated in general that normally the angle included between the flange and baffle portion will range from about 90° to 180°. The simplicity and the ease of assembly of the deflector parts are obvious from the foregoing disclosure, as well as the ease of assembly of the deflector with the tray. Similarly, it will be obvious that the deflector may be cleaned easily and speedily, and that the tray likewise may be readily cleaned, the deflector being readily removed and reapplied to facilitate cleaning of either or both the deflector and tray.

Although the flange 22 is advantageous in providing leverage to increase the biasing effect of the springs on the deflector, and in serving as a limiting stop determining the fully biased position of the deflector, it may be omitted and a fully operative and effective deflector still provided according to the invention. The springs 25 may be engaged with the bottom of the tray otherwise than in the manner specifically shown and described, and other resilient means than the flat springs disclosed may be employed for biasing the deflector, as for example coil spring means, tubular or other constructors of rubber of other resilient material, or the like. It will also be understood that while it is preferable to have the lower edge of the deflector engaging on the bottom of the tray, the deflector might be spaced above the bottom and still serve to direct an effective volume of air upwardly through the shelf 18. Similarly, as has already been indicated hereinabove, the deflector need not extend into engagement with the shelf 18 in all positions, but will effectively achieve its purpose even if the shelf in one or more of its positions is spaced above the upper edge of the deflector.

It will accordingly be understood that the single embodiment of the invention illustrated herein is exemplary of the inventive concept and that the invention is not limited to such embodiment, since modifications and variations thereof, some of which have been described and suggested hereinabove, may be made without departing from the spirit and scope of the invention as set forth in the appended claims.

I claim:

1. For use in a display case having a perforate shelf vertically adjustable above the bottom of a chamber in which air may flow beneath said shelf, an air deflector comprising a baffle, a flange extending along an edge of said baffle, an aperture in the baffle, an aperature in said flange substantially aligned transversely of said edge with said baffle aperture, said baffle having a dimension in the direction transverse of said edge greater than the distance between the chamber bottom and the shelf in at least the lowest vertically adjusted position thereof, and a flat spring extending through both apertures and having a bent end portion beyond the flange adapted to engage releasably with said chamber bottom.

2. For use in a display case having a perforate shelf vertically adjustable above the bottom of a chamber in which air may flow beneath said shelf, an air deflector comprising a baffle, and resilient means for hingedly mounting said baffle on said chamber bottom and biasing the baffle toward a position deflecting air upwardly through the shelf, said baffle having its dimension transverse of its hinging axis greater than the distance between the chamber bottom and the shelf in at least certain of its vertically adjusted positions.

3. A display case comprising a chamber, a perforate shelf adjustable vertically above the bottom of said chamber, means for moving a stream of air beneath the shelf, an aperture in said chamber bottom, and a deflector for directing the air stream upwardly through the shelf in any vertically adjusted position thereof, said deflector comprising a baffle of sheet material having a flange along an edge thereof and disposed below the shelf with said flanged edge hingedly related to the chamber bottom, said baffle having a dimension in the direction transverse of said edge greater than the maximum vertical spacing of the shelf above the bottom, a pair of apertures in the deflector aligned with each other and with said bottom aperture in said direction, said pair comprising an aperture in said baffle and another aperture in said flange, and a flat spring extending through the three apertures and having a bent lower end portion engaging the lower surface of the chamber bottom, said spring biasing the deflector to swing toward engagement with the shelf.

4. A display case comprising a chamber, a perforate shelf adjustable vertically above the bottom of said chamber, means for moving a stream of air beneath said shelf, a deflector for directing the air stream upwardly through the shelf in any vertically adjusted position thereof, said deflector comprising a baffle disposed below the shelf, and resilient means hingedly securing said baffle on the chamber bottom and biasing the baffle toward engagement with the shelf, said baffle having a dimension transverse of the hinging axis greater than the maximum vertical spacing of the shelf above the bottom.

5. In a display case having an open-topped chamber therein, a perforate shelf vertically adjustable in said chamber, and means for moving an air stream beneath said shelf, an air deflector comprising a baffle disposed with an edge thereof pivotally related to said chamber bottom and having a dimension transverse of said edge greater than at least the minimum vertical adjustment of the shelf from the chamber bottom, and resilient means hingedly mounting the baffle on the bottom and biasing the deflector to swing upwardly toward the shelf.

References Cited by the Examiner
UNITED STATES PATENTS

| 1,732,082 | 10/1929 | Clements | 98—99.2 |
| 2,290,647 | 7/1942 | Lowell | 62—256 X |
| 2,863,302 | 12/1958 | Morris | 62—256 |
| 3,165,053 | 1/1965 | Christie | 98—38 X |

ROBERT A. O'LEARY, Primary Examiner.

W. E. WAYNER, Assistant Examiner.